United States Patent
Paulis et al.

(10) Patent No.: US 9,549,076 B2
(45) Date of Patent: Jan. 17, 2017

(54) METHOD FOR LAWFUL INTERCEPTION DURING CALL FORWARDING IN A PACKET-ORIENTED TELECOMMUNICATIONS NETWORK

(75) Inventors: Herbert Paulis, Vienna (AT); Bernhard Spalt, Vienna (AT)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 255 days.

(21) Appl. No.: 12/225,738

(22) PCT Filed: Mar. 7, 2007

(86) PCT No.: PCT/EP2007/052124
§ 371 (c)(1),
(2), (4) Date: Oct. 22, 2008

(87) PCT Pub. No.: WO2007/113068
PCT Pub. Date: Oct. 11, 2007

(65) Prior Publication Data
US 2009/0232128 A1    Sep. 17, 2009

(30) Foreign Application Priority Data
Mar. 30, 2006   (DE) .................. 10 2006 014 921

(51) Int. Cl.
*H04M 7/00*        (2006.01)
*H04M 3/22*        (2006.01)
(Continued)

(52) U.S. Cl.
CPC ............ *H04M 7/006* (2013.01); *H04L 63/306* (2013.01); *H04M 3/2281* (2013.01); *H04M 3/54* (2013.01)

(58) Field of Classification Search
None
See application file for complete search history.

(56) References Cited

U.S. PATENT DOCUMENTS 5,796,790 A *  8/1998  Brunner .................. 455/406
5,930,698 A *  7/1999  Bertacchi ................ 455/405
(Continued)

FOREIGN PATENT DOCUMENTS

CN       1499803       *  5/2004
DE    101 16 786 A1       10/2002
(Continued)

*Primary Examiner* — Andrew Oh
(74) *Attorney, Agent, or Firm* — Squire Patton Boggs (US) LLP

(57) ABSTRACT

The invention relates to a method for lawful interception in the case of call forwarding (AW_TlnB) in a packet-oriented telecommunications network (TK1, TK2, TK3), in which switching functions (S-CSCF1, ..., P-CSCF3) are made available by servers. The additional aim in this telecommunications network (TK1) is to monitor connections of a subscriber (Tln B) with call forwarding (AW_TlnB) by means of lawful interception. In this case, monitoring (ÜW_TlnB) of the connections of the subscriber (Tln B) is notified to a first switching function (S-CSCF1) which is responsible for a called subscriber (Tln B) with call forwarding (AW_TlnB). The first switching function (S-CSCF1) then writes (23) a tag for said subscriber (Tln B) to a predetermined parameter of a switching protocol. Only then is signalling of call forwarding (AW-TlnB) carried out to a second switching function (S-CSCF2) which is responsible for a calling subscriber (Tln A) and the connection is then forwarded to a third switching function (S-CSCF3). In this case, this third switching function (S-CSCF3) then identifies and initiates the monitoring (ÜW_TlnB) of the called subscriber (Tln B) on the basis of the predetermined parameter of the switching protocol. The major advantage of
(Continued)

Figure 1:
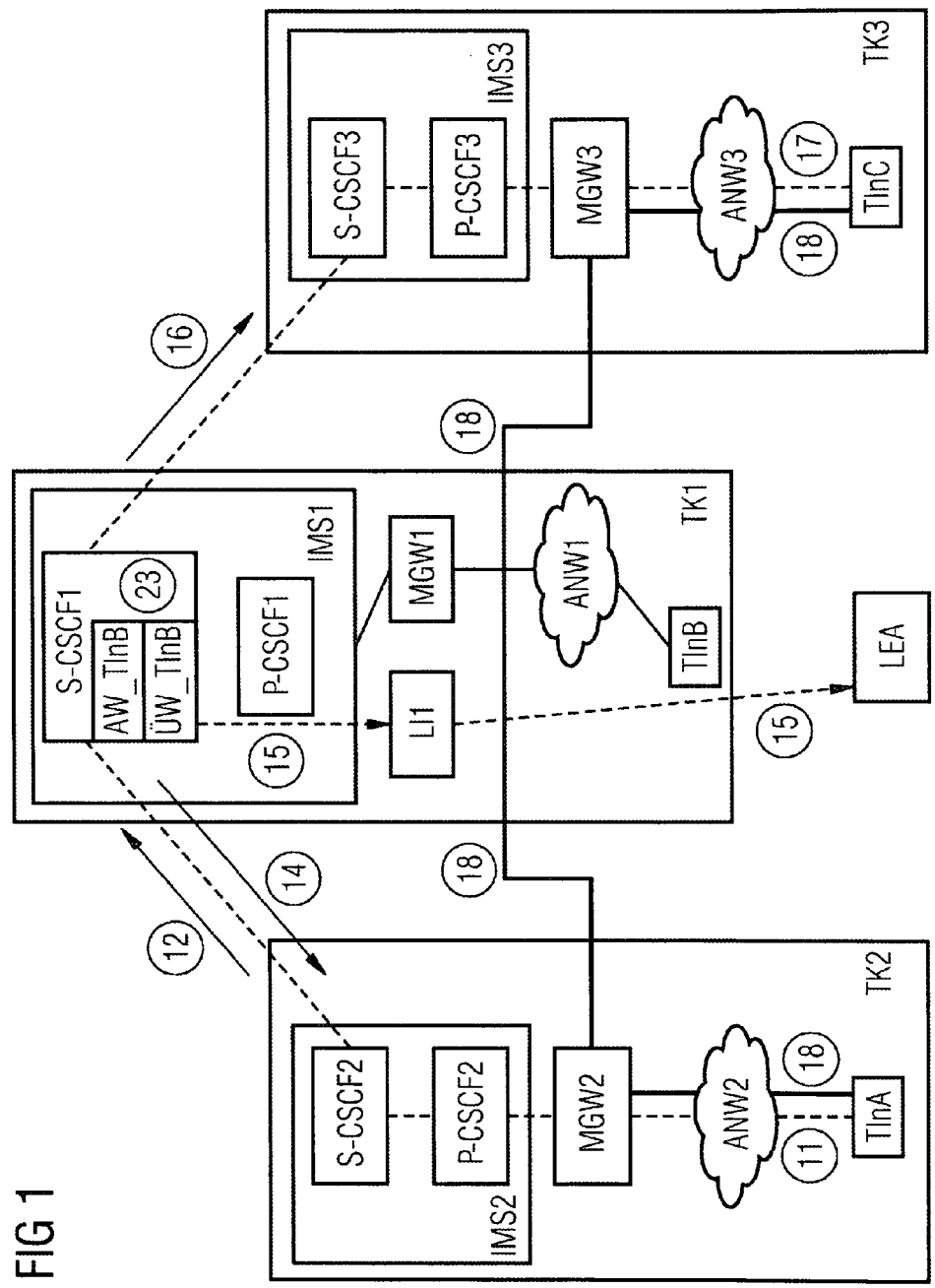

the method according to the invention is that it is still possible for a department or authority who is empowered to carry out monitoring to monitor (ÜW_TlnB) the contents of connections in a packet-oriented telecommunications network (TK1) even in the case of call forwarding (AW_TlnB).

24 Claims, 2 Drawing Sheets

(51) Int. Cl.
*H04M 3/54* (2006.01)
*H04L 29/06* (2006.01)

(56) References Cited

U.S. PATENT DOCUMENTS

| | | | | |
|---|---|---|---|---|
| 5,943,393 A * | 8/1999 | Howell | | H04M 3/2281 |
| | | | | 379/211.02 |
| 6,208,864 B1 * | 3/2001 | Agrawal | | H04M 3/58 |
| | | | | 455/445 |
| 6,272,215 B1 * | 8/2001 | Cockrell et al. | | 379/219 |
| 6,393,269 B1 * | 5/2002 | Hartmaier | | H04M 15/854 |
| | | | | 455/406 |
| 6,549,613 B1 * | 4/2003 | Dikmen | | H04L 63/30 |
| | | | | 379/134 |
| 6,914,970 B2 * | 7/2005 | Huang | | H04M 3/436 |
| | | | | 379/211.01 |
| 6,987,849 B2 * | 1/2006 | Ravishankar | | H04L 63/00 |
| | | | | 379/221.1 |
| 6,990,125 B1 * | 1/2006 | Fedane | | 370/524 |
| 7,050,559 B2 * | 5/2006 | Silver | | H04M 3/53333 |
| | | | | 379/100.08 |
| 7,194,078 B2 * | 3/2007 | Stumer | | H04L 49/104 |
| | | | | 379/201.12 |
| 7,372,949 B1 * | 5/2008 | Kurth | | H04M 3/2281 |
| | | | | 379/196 |
| 7,433,456 B2 * | 10/2008 | Huang | | H04M 3/436 |
| | | | | 379/211.01 |
| 7,733,821 B2 * | 6/2010 | Kolor | | H04L 29/06 |
| | | | | 370/235 |
| 7,738,426 B2 * | 6/2010 | Smith | | H04W 88/16 |
| | | | | 370/331 |
| 7,805,161 B1 * | 9/2010 | Jones | | H04W 8/02 |
| | | | | 455/435.1 |
| 8,010,112 B1 * | 8/2011 | Delker | | H04L 12/66 |
| | | | | 455/437 |
| 2002/0054674 A1 * | 5/2002 | Chang et al. | | 379/207.02 |
| 2002/0159578 A1 * | 10/2002 | Bern | | H04L 63/306 |
| | | | | 379/219 |
| 2003/0023523 A1 * | 1/2003 | McKibben | | G06Q 30/04 |
| | | | | 705/34 |
| 2003/0179747 A1 * | 9/2003 | Pyke et al. | | 370/389 |
| 2003/0190032 A1 * | 10/2003 | Ravishankar | | H04L 63/00 |
| | | | | 379/229 |
| 2004/0028032 A1 * | 2/2004 | Rantanen et al. | | 370/352 |
| 2004/0157629 A1 * | 8/2004 | Kallio et al. | | 455/466 |
| 2004/0185836 A1 * | 9/2004 | Pelaez et al. | | 455/414.1 |
| 2004/0219911 A1 * | 11/2004 | Kouchri | | H04M 3/2281 |
| | | | | 455/423 |
| 2005/0025130 A1 * | 2/2005 | Hoffmann | | 370/352 |
| 2005/0053219 A1 * | 3/2005 | Pearson et al. | | 379/211.02 |
| 2005/0094651 A1 * | 5/2005 | Lutz | | H04M 3/2281 |
| | | | | 370/401 |
| 2005/0169451 A1 * | 8/2005 | Huang | | H04M 3/436 |
| | | | | 379/220.01 |
| 2005/0191995 A1 * | 9/2005 | Nguyen | | H04Q 3/0029 |
| | | | | 455/414.1 |
| 2005/0213520 A1 * | 9/2005 | Bae | | H04W 76/062 |
| | | | | 370/277 |
| 2006/0039397 A1 * | 2/2006 | Hari | | H04L 29/06027 |
| | | | | 370/431 |
| 2006/0111112 A1 * | 5/2006 | Maveddat | | H04W 8/02 |
| | | | | 455/439 |
| 2006/0262908 A1 * | 11/2006 | Chambers | | H04M 3/385 |
| | | | | 379/88.01 |
| 2006/0264200 A1 * | 11/2006 | Laiho | | H04M 3/2281 |
| | | | | 455/410 |
| 2006/0268921 A1 * | 11/2006 | Ekstrom et al. | | 370/437 |
| 2006/0270447 A1 * | 11/2006 | Everson | | H04L 29/06027 |
| | | | | 455/552.1 |
| 2007/0116234 A1 * | 5/2007 | Schneider | | H04M 3/58 |
| | | | | 379/219 |
| 2007/0121812 A1 * | 5/2007 | Strange et al. | | 379/70 |
| 2007/0127662 A1 * | 6/2007 | Morehead | | 379/198 |
| 2007/0177577 A1 * | 8/2007 | Kolor | | H04L 29/06 |
| | | | | 370/352 |
| 2007/0177603 A1 * | 8/2007 | Calme et al. | | 370/395.2 |
| 2008/0261586 A1 * | 10/2008 | Joensuu | | H04M 3/2236 |
| | | | | 455/424 |
| 2009/0067411 A1 * | 3/2009 | Heidermark et al. | | 370/352 |
| 2010/0220667 A1 * | 9/2010 | Noldus | | H04W 8/082 |
| | | | | 370/329 |

FOREIGN PATENT DOCUMENTS

| | | |
|---|---|---|
| DE | 10 2004 040 479 A1 | 3/2006 |
| EP | 1111839 A2 | 6/2001 |
| WO | WO 2004/092150 A1 | 10/2004 |

* cited by examiner

METHOD FOR LAWFUL INTERCEPTION DURING CALL FORWARDING IN A PACKET-ORIENTED TELECOMMUNICATIONS NETWORK

The invention relates to a method for lawful interception during call forwarding in a packet-oriented telecommunication network in which switching functions are provided by servers and wherein calls associated with a subscriber with call forwarding are intended to be monitored by means of lawful interception.

In many of the world's countries, there is a certain interest in being able to monitor telecommunication processes and contents for subscribers under particular circumstances. In this case, by way of example, telephone calls need to be monitored, but e-mails, short messages (known as SMS), faxes etc. also need to be read. Legal constraints and principles for telecommunication monitoring are then usually stipulated in various national acts and/or decrees in the respective countries—such as in a police act, in the code of criminal procedure, in a constitutional act, in a telecommunication monitoring decree, etc. These acts and decrees rule that the telecommunication monitoring may be performed only for the purpose of criminal prosecution and can be arranged only by a judge, for example.

The technical expression "lawful interception" (LI) denotes a security process in this context. By this means, an operator of a telecommunication network or a provider of telecommunication services (e.g. internet provider, IP telephony provider, etc.) allows a national office or authority authorized for monitoring (e.g. police, customs tracing, etc.), which is generally also referred to as a law enforcement agency (LEA), to access telecommunication processes and contents (e.g. telephone calls, e-mail traffic or fax traffic, call-related data such as dialed telephone number, telephone number of an incoming call, etc.) for a particular subscriber. Lawful interception usually allows the nationally authorized office or authority to enter particular calls and thereby to eavesdrop on/monitor the telecommunication processes of a particular subscriber which are taking place therein.

Usually, what is known as a lawful interception interface for a data transmission between the telecommunication network operator or telecommunication service provider and the monitoring office or authority is set up for this purpose in the telecommunication network. In an instance of monitoring, this lawful interception interface is then used to transmit, by way of example, data—such as call contents, fax data, call-related data, contents of e-mails or short messages—from the telecommunication network to a monitoring device of the legally authorized office or authority, usually in real time.

To make it easier to implement lawful interception and in order also to allow cross-border—e.g. Europe-wide—monitoring of telecommunication processes and contents, standards and technical specifications have been developed for lawful interception and the relevant interfaces—examples being ES 201 671 Telecommunications Security; Lawful Interception (LI); Handover Interface for Lawful Interception of Telecommunications Traffic; TS 101 232 Telecommunications Security; Lawful Interception (LI); Handover Specification for IP delivery, etc., which have been published by the Technical Committee on Lawful Interception (TC LI) of the European Telecommunications Standards Institute (ETSI). These standards and technical specifications for lawful interception which has been published by ETSI are used primarily in Europe, in large parts of Asia and in some cases also in Australia. These standards provide a very detailed description not only of the architecture of a system and the interfaces for lawful interception but also of telecommunication-network-specific protocol requirements and procedures which are necessary in order to transmit data for the telecommunication processes of a monitored subscriber from the telecommunication network operator or provider of telecommunication services to the office or authority legally authorized for monitoring.

In the USA, the principles for lawful interception have been defined in what is known as the Communications Assistance for Law Enforcement Act (CALEA) and have been supplemented by publications from various committees of the Alliance for Telecommunications Industry Solutions (ATIS)—such as PTSC LAES (Packet Technologies and Systems Committee Lawfully Authorized Electronic Surveillance) or WTSC LI (Wireless Technologies and Systems Committee Lawful Intercept)—for various telecommunication network types, such as mobile radio networks, IP-based networks, etc.

By definition, a telecommunication network is understood to be the generic term for all resources which connect remote network access points, such as terminals, to one another. Telecommunication networks provide services such as the transmission of data or voice from one access point to another access point in order to interchange information in the form of data or voice between said access points. By way of example, telecommunication networks comprise:
circuit-switched networks—such as the conventional landline telephone networks—what are known as public switched telephone networks (PSTN), ISDN networks or mobile radio networks based on GSM, circuit switch portion of the universal mobile telecommunications system (UMTS) etc.
and packet-oriented telecommunication networks, in which information is transmitted in the form of data packets—such as data networks or packet-oriented network portions of mobile radio networks—e.g. General Packet Radio Service (GPRS), which is an extension of the GSM mobile radio standard by packet-oriented data transmission, or e.g. what is known as the packet switch domain (the packet-oriented portion) of the Universal Mobile Telecommunications System (UMTS), for which the $3^{rd}$ Generation Partnership Project or 3GPP delivers the standards. UMTS 3GPP lawful interception is specified in the "releases" of the standard TS 33 107 and TS 33 108, for example.

Packet-oriented telecommunication networks use protocols for transmitting data in packet form within the network or else between different networks. If the "Internet Protocol" IP is used for forwarding the data, these packet-oriented telecommunication networks are also referred to as IP-based telecommunication networks, the IP-based telecommunication network which is known worldwide being the Internet.

The great importance of the Internet Protocol means that there is currently the tendency to allow voice transmission using the Internet Protocol (Voice-Over-IP) in IP-based, fixed telecommunication networks (e.g. local area networks, intranet, Internet). However, the development of new standards for the mobile radio networks, such as UMTS, means that the Internet Protocol is also being used in the packet-oriented network portions (e.g. packet switched domain in the case of UMTS) in the mobile radio sector. This allows firstly telephony (transmission of voice) using the Internet Protocol—what is known as Voice-Over-IP—and secondly packet-oriented data transmission from a mobile (packet-oriented and usually IP-based) telecommunication network.

To be able to manage a connection which is required for services such as Voice-Over-IP, video telephony, interchange of multimedia data, etc., there are currently two competing standards for the signaling: H.323 and SIP.

The ITU-T standard H.323 (ITU; International Telecommunication Union) has been developed for real-time transmission of services such as voice and video communication in packet-oriented telecommunication networks. As a so-called umbrella standard, it accommodates a series of protocols, for example signaling, interchange of terminal functionalities and status information and also for connection and data-flow control. For the data transmission, to and from a conventional (circuit-switched) telecommunication network, interface functions defined in H.323 are described which are implemented on special computers—what are known as gatekeepers. In addition H.323 is based on the ISDN protocol Q.931 of the ITU and is therefore very suitable for interworking between ISDN and IP.

The Session Initiation Protocol SIP was developed by the IETF (Internet Engineering Task Force). The standard defines a signaling protocol for setting up, modifying and terminating sessions with two or more subscribers. The SIP protocol is likewise used for transmitting data via packet-oriented telecommunication networks and is comparable in terms of function to the protocols based on the ITU-T standard H.323. The Session Initiation Protocol SIP can convey interactive services, including voice, via packet-oriented telecommunication networks, these networks usually also being IP-based for the most part. In this case, the SIP protocol is responsible for signaling the call and also for locating and registering subscribers. In particular, SIP also allows transmission of an identifier for a subscriber—what is known as an SIP address—or SIP-URIs (Uniform Resource Indicators) or what are known as TEL-URIs and also call forwarding in packet-oriented telecommunication networks.

To be able to provide specific services, such as Voice-over-IP or packet-oriented data transmission (e.g. e-mail, Internet access, etc.) using a packet-oriented network portion in a mobile radio network, a specific architecture structure—what is known as the IP multimedia subsystem IMS—is used particularly in connection with SIP. The IP multimedia subsystem may also be used for wireless local area networks (W-LAN) or fixed, packet-oriented telecommunication networks, however, in order to be able to provide multimedia services, such as video telephony, video conferencing, interchange of multimedia data, etc. in packet-oriented telecommunication networks. The IP multimedia subsystem has been standardized by the $3^{rd}$ Generation Partnership Project 3GPP in cooperation with the IETF in a large number of technical specifications and is an open, standardized architecture structure which operators can easily integrate into their telecommunication network structure.

The IP multimedia subsystem can be accessed, by way of example, using packet-oriented telecommunication networks (e.g. Ethernet, DSL, GPRS, UMTS, WLAN, etc.), for example using special—usually SIP-compatible—terminals. For connection from conventional—usually circuit-switched—telephone networks (e.g. Public Switched Telephone Network PSTN, ISDN networks, GSM networks etc.) or, by way of example, Voice-Over-IP systems based on H.323, dedicated interface systems—what are known as media gateways—are used. A subscriber can therefore use various methods, depending on the network used (e.g. circuit-switched telephone network, mobile radio network, WLAN, etc.), to access the IP multimedia subsystem, with the Internet Protocol IP usually being used for the access. Further details are stipulated by ETSI TISPAN in cooperation with 3GPP.

For the use of the services by the subscriber, the IP multimedia subsystem provides switching functions—what are known as Call Session Control Functions CSCF, which are executed by what are known as switching computers in the IP multimedia subsystem. In the case of Call Session Control Functions, a distinction can be drawn between what is known as the Proxy Call Session Control Function (P-CSCF) and what is known as the Serving Call Session Control Function (S-CSCF).

The P-CSCF is a first point of contact for the IP multimedia subsystem for signaling a call, said call being able to be routed directly by special—usually SIP-compatible—terminals via a packet-oriented "access network" or by a media gateway from an access network in another telecommunication network (e.g. PSTN, ISDN network, GSM network, etc.) to the IP multimedia subsystem. In this case, the access network denotes that portion of a telecommunication network to which the subscribers are connected or via which they have access to the services provided (e.g. Voice telephony, IP telephony, access to the Internet, etc.). The S-CSCF is used to inspect and control the setup and course of a call between subscribers or for the use of a service. In this case, the S-CSCF also registers a subscriber using an identifier (e.g. IP address, SIP address, etc.) and forwards the call for using services (e.g. IP telephony etc.). The protocol used for managing calls is usually the Session Initiation Protocol SIP.

A specification for lawful interception when using an IP multimedia subsystem is described by the technical specifications TS 33.107 and TS 33.108 in release 7 from the 3GPP, which are also valid for UMTS. According to these technical specifications from the 3GPP, all SIP messages from or to a subscriber to be monitored and all SIP messages implemented for this subscriber are simultaneously documented for a call using the IP multimedia subsystem by the switching functions P-CSCF and S-CSCF of the IP multimedia subsystem and then forwarded to the monitoring device of the office or authority legally authorized for monitoring via a lawful interception interface and possibly a media gateway. In this case, an identifier for the monitoring subscriber—usually what is known as the SIP address—is used as what is known as a target identifier (e.g. stored in a special list for identifiers which are to be monitored) in order to initiate the monitoring by the Call Session Control Functions (e.g. P-CSCF and/or S-CSCF).

Particularly protocols such as SIP allow call forwarding to be made available to a subscriber in packet-oriented telecommunication networks too. Call forwarding denotes a service feature of a telecommunication network in which an incoming call is forwarded to another subscriber identifier (e.g. telephone number, etc.).

Call forwarding is provided as a service feature usually in circuit-switched telecommunication networks, such as ISDN networks, GSM networks or by the circuit switch portion of a UMTS network or by private branch exchanges. Lawful interception in the case of service features such as call forwarding in a circuit-switched telecommunication network is described by ETSI in the specification ES 201 671, for example. The technical specifications TS 33.107 and TS 33.108 in release 7 from the 3GPP likewise present lawful interception for call forwarding—but only for the circuit switch portion of a UMTS network.

If a subscriber to be monitored has set up call forwarding in a packet-oriented telecommunication network, e.g. for Voice-Over IP, then although the monitoring for an incoming call is recognized in that switching function, usually provided by a server in the network, in which the subscriber is usually registered, the call forwarding is signaled back to the calling subscriber. The call for transmitting the data (e.g. call content, etc.) is then set up directly between the access point of the calling subscriber and an access point associated with a destination for the call forwarding, however. If the subscriber identifier for this access point is not monitored, there is no way of eavesdropping on the content of the data transmission, since said content is not forwarded to the office or authority authorized for monitoring. The office or authority authorized for monitoring can now only establish that the subscriber to be monitored has set up call forwarding in the packet-oriented telecommunication network, for example.

The present invention is therefore based on the object of specifying a method which allows an office or authority authorized for monitoring to monitor contents of a forwarded call in the case of call forwarding for a subscriber to be monitored in a packet-oriented telecommunication network too.

The object is achieved by a method of the type cited at the outset, wherein a first switching function, which is responsible for a called subscriber with call forwarding, is notified of monitoring of the calls associated with this subscriber, the first switching function then writes an identifier for this subscriber into a prescribed parameter of a switching protocol, the call forwarding is then first signaled to a second switching function, which is responsible for a calling subscriber, and then a third switching function, to which the call has been forwarded, identifies and then initiates the monitoring of the called subscriber using the prescribed parameter of the switching protocol.

The main aspect of the solution according to the invention is that the method according to the invention allows the office or authority authorized for monitoring to monitor the subscriber in the case of call forwarding too, since the monitoring is initiated via the switching function to which the call has been forwarded. This now allows the contents of the data transmission to be eavesdropped upon from an access point associated with a destination for the call forwarding.

The object is also achieved by virtue of a plurality of call forwarding operations being able to be performed in series in the IP-based telecommunication network for the subscriber to be monitored so that, if call diversion is in turn set up for the subscriber identifier to which the call is forwarded, the last switching function to which the call was diverted checks whether an identifier which needs to be monitored is entered in the prescribed parameters. If one of the entered identifiers is an identifier to be monitored then the last switching function initiates monitoring of the subscriber associated with the identifier.

It is advantageous if the switching protocol used in the IP-based telecommunication network is the Session Initiation Protocol SIP, since the SIP protocol is specified particularly in RFC 3261 from the IETF. In addition, SIP is responsible for signaling the call and for locating and registering subscribers, which means that SIP also allows transmission of an identifier for a subscriber—what is known as the SIP address or what is known as the SIP-URI (Uniform Resource Indicator).

In preferred refinements of the invention, either the identifier of the called subscriber to be monitored is entered into the SIP History-Info header based on RFC 4244 or the identifier of the called subscriber to be monitored is entered into the SIP Division header based on IETF draft-levy-SIP-diversion-08. RFC 4244 from the IEFT, in which the SIP History-Info header is specified, defines standard mechanisms in order to record information about the course of a call (e.g. why or how a call has been routed to a particular server or access point). From the SIP History-Info header, it is therefore also possible to read call forwarding. It is therefore advantageous that the identifier of the called subscriber to be monitored is entered into the SIP History-Info header. In the Diversion Indication in SIP based on IETF draft-levy-SIP-diversion-08, an extension to the SIP protocol is proposed which allows the called subscriber terminal to establish from which subscriber and why a call has been diverted. This extension defines what is known as the SIP Diversion header, which transmits the information about the diversion of the call.

It is beneficial if the IP-based telecommunication network comprises an IP multimedia subsystem which provides the switching function as a function, since a concept for lawful interception without call forwarding has already been described for the IP multimedia subsystem by the 3GPP in Technical Specifications TS 33.107 and TS 33.108, which concept can easily be extended by the method according to the invention when the subscriber to be monitored has set up call forwarding by virtue of the switching functions of the IP multimedia subsystem to which the call is forwarded checking whether the subscriber with the call forwarding is a subscriber to be monitored—e.g. by comparing the subscriber identifier entered in an SIP message with a special list which comprises the identifiers to be monitored.

It is also advisable for the switching protocol used in the IP-based telecommunication network to be the H.323 protocol, because H.323 as a standard of the ITU-T has been developed specifically for real-time transmission of services such as voice and video communication in packet-oriented networks.

Preferably, contents of the forwarded call are routed to a monitoring entity via a media gateway or via a gatekeeper or serving GPRS support node or session border controller, because these network elements can easily be used to transmit the contents to the network of the office or authority authorized for monitoring.

Preferably, the monitoring (ÜW_TlnB) of the contents of the forwarded call is initiated and performed in the media gateway or serving GPRS support node or session border controller without interaction with the switching function, wherein a subscriber can likewise be identified as a subscriber to be monitored in these network elements (e.g. using a special list stored therein with identifiers to be monitored) and therefore the monitoring of this subscriber is not recognized externally.

It is advantageous if lawful interception is activated only for particular switching functions provided by servers in the packet-oriented telecommunication network, and/or in network elements such as the media gateway or serving GPRS support node or session border controller. This is because this allows different monitoring requirements, usually determined by national laws, in the individual countries to be met when transnational monitoring needs to be performed.

Figure 2:
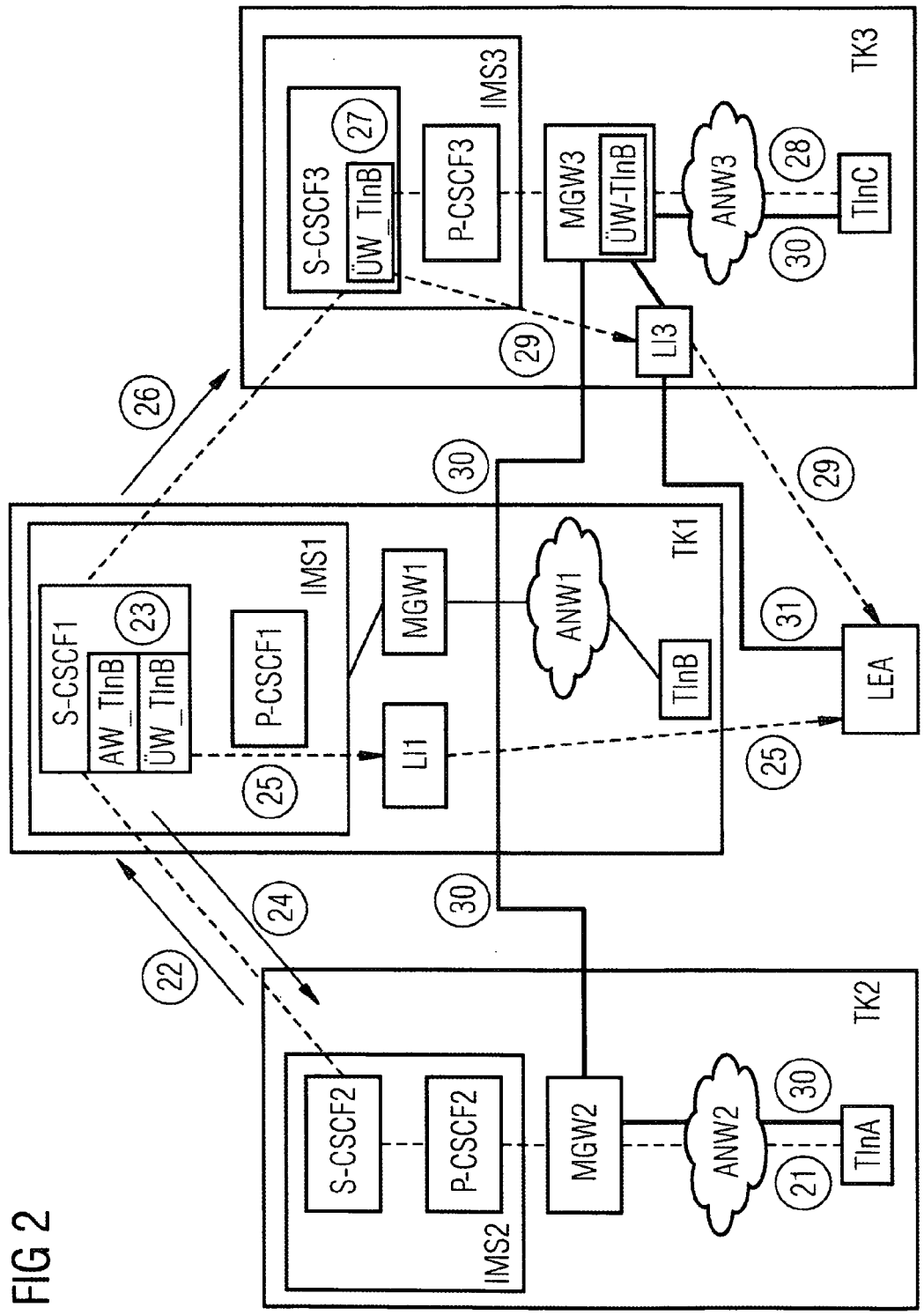

The invention is explained in more detail below by way of example with reference to the appended figures, in which:

FIG. 1 shows the schematic course of lawful interception in the case of call forwarding in a packet-oriented telecommunication network with an IP multimedia subsystem, FIG. 2 shows the schematic course of the method according to the invention for lawful interception in the case of call forwarding in a packet-oriented telecommunication network with an IP multimedia subsystem.

FIG. 1 shows an example comprising packet-oriented telecommunication networks TK1, TK2 and TK3 to which subscribers Tln A, Tln B, Tln C are connected via access networks ANW1, ANW2, ANW3, for example. The packet-oriented telecommunication networks TK1, TK2, TK3 respectively comprise an IP multimedia subsystem IMS1, IMS2, IMS3. By way of example, switching functions S-CSCF1, S-CSCF2, S-CSCF3, P-CSCF1, P-CSCF2, P-CSCF3, which are distinguished as what are known as Proxy Call Session Control Functions P-CSCF1, P-CSCF2, P-CSCF3 and what are known as Serving Call Session Control Functions S-CSCF1, S-CSCF2, S-CSCF3, are shown in the IP multimedia subsystems.

In this case, the Proxy Call Session Control Function P-CSCF1, P-CSCF2, P-CSCF3 is a first point of contact for the respective IP multimedia subsystem IMS1, IMS2, IMS3 for signaling a call. By way of example, the signaling is routed from the respective access network ANW1, ANW2, ANW3, which connects the respective subscriber Tln A, Tln B, Tln C to the respective packet-oriented telecommunication network TK1, TK2, TK3, to the Proxy Call Session Control Function P-CSCF1, P-CSCF2, P-CSCF3 of the respective IP multimedia subsystem IMS1, IMS2, IMS3, for example via a media gateway MGW1, MGW2, MGW3. Using a special—usually SIP compatible—terminal, the signaling can also be transmitted directly from the access network ANW1, ANW2, ANW3 to the Proxy Call Session Control Functions P-CSCF1, P-CSCF2, P-CSCF3 of the IP multimedia subsystem IMS1, IMS2, IMS3.

The Serving Call Session Control Function S-CSCF1, S-CSCF2, S-CSCF3 of the IP multimedia subsystem IMS1, IMS2, IMS3 is used to inspect and control the setup and course of a call between the subscribers Tln A, Tln B, Tln C or for the use of a service. In this case, the Serving Call Session Control Function S-CSCF1, S-CSCF2, S-CSCF3 of the IP multimedia subsystem IMS1, IMS2, IMS3 also registers the subscribers Tln A, Tln B, Tln C using an identifier such as an IP address, SIP-URL etc. and performs the signaling for forwarding the call for using services (e.g. IP telephony, etc.). The protocol used for managing calls is usually the Session Initiation Protocol SIP.

For the packet-oriented telecommunication network TK1, a lawful interception interface LI1 is shown which can be used to transmit monitoring-related data (e.g. call contents, e-mail contents, call-related data, etc.) to a monitoring device LEA of an office or authority authorized for monitoring, such as police, customs tracing etc.

If, by way of example, a subscriber Tln B in the packet-oriented telecommunication network TK1 now needs to be monitored, the identifier (e.g. SIP-URI) of this subscriber Tln B is flagged as what is known as a target identifier (e.g. entered into a special list which is stored on the switching functions S-CSCF1, S-CSCF2, S-CSCF3, P-CSCF1, P-CSCF2, P-CSCF3). As a result, monitoring ÜW_TlnB is recognized and can be initiated by the Serving Call Session Control Function S-CSCF1 in which the subscriber Tln B is usually located.

In addition, call forwarding AW_TlnB is set up for the identifier of the subscriber Tln B to be monitored in the Serving Call Session Control Function S-CSCF1 responsible for the subscriber registration. This call forwarding AW_TlnB forwards a call for the subscriber Tln B to, for example, an access point for a subscriber Tln C whose identifier is not flagged as a target identifier for monitoring.

If a subscriber Tln A connected to the packet-oriented telecommunication network TK2 now sets up a call to the subscriber Tln B to be monitored in the packet-oriented telecommunication network TK1, in a first step 11 the call setup is signaled by access network ANW2 via the media gateway MGW2 to the Proxy Call Session Control Function P-CSCF2 of the IP multimedia subsystem IMS2, which forwards the signaling to the Serving Call Session Control Function S-CSCF2 of the IP multimedia subsystem IMS2. In a second step 12, the Serving Call Session Control Function S-CSCF2 of the IP multimedia subsystem IMS2 contacts the Serving Call Session Control Function S-CSCF1 of the IP multimedia subsystem IMS2 and transmits a request for call setup with the subscriber Tln B, e.g. in the form of an SIP message, to the Serving Call Session Control Function S-CSCF1.

In a third step 13, the Serving Call Session Control Function S-CSCF1 recognizes that firstly call forwarding AW_TlnB to the access point of the subscriber Tln C has been set up for the subscriber Tln B and that secondly the identifier of the subscriber Tln B has been flagged for monitoring ÜW_TlnB. Therefore, in a fourth step 14, the call forwarding is signaled, e.g. by means of an SIP message, to the Serving Call Session Control Function S-CSCF2 of the IP multimedia subsystem IMS2 in the packet-oriented telecommunication network TK2 of the calling subscriber Tln A. In a fifth step 15, on the basis of the monitoring üW_TlnB of the subscriber Tln B, the signaling—e.g. a copy of the SIP message—of the call forwarding is forwarded via the lawful interception interface LI1 to the monitoring device LEA of the office or authority authorized for monitoring.

In a sixth step 16, a request for call setup with the access point of the subscriber Tln C is now sent, e.g. in the form of an SIP message, to the Serving Call Session Control Function S-CSCF3 of the IP multimedia subsystem IMS3 in the packet-oriented telecommunication network TK3 on the basis of the call forwarding AW_TlnB. In a seventh step 17, the signaling is then transmitted from the IP multimedia subsystem IMS3, for example via a media gateway MGW3, to the access network ANW3—and hence to the access point of the subscriber Tln C. In an eighth step 18, the call is then set up directly between the calling subscriber Tln A (or whose access point) and the access point of the subscriber Tln C for data transmission (e.g. IP telephony, e-mail etc.) via the respective media gateways MGW2, MGW3 of the respective packet-oriented telecommunication networks TK2, TK3.

If the subscriber Tln C to whom the call has been forwarded is not being monitored, contents of the call (e.g. call contents, data, etc.) are not transmitted to the monitoring device LEA of the office or authority authorized for monitoring, and the call therefore cannot be eavesdropped upon.

FIG. 2 shows another example comprising the packet-oriented telecommunication networks TK1, TK2 and TK3 to which subscribers Tln A, Tln B, Tln C are connected via access networks ANW1, ANW2, ANW3, for example. Again, the packet-oriented telecommunication networks TK1, TK2, TK3 respectively comprise an IP Multimedia Subsystem IMS1, IMS2, IMS3 in which, by way of example, the switching functions—Proxy Call Session Control Functions P-CSCF1, P-CSCF2, P-CSCF3 and Serving Call Session Control Functions S-CSCF1, S-CSCF2, S-CSCF3—are shown.

Besides the lawful interception interface LI1 of the packet-oriented telecommunication network TK1, a lawful interception interface LI3 is likewise shown in the packet-oriented telecommunication network TK3, said lawful interception interface LI3 likewise being able to be used to transmit monitoring-related data (e.g. call contents, e-mail contents, call-related data, etc.) to the monitoring device LEA of an office or authority authorized for monitoring, such as police, customs tracing, etc.

As in FIG. 1, the subscriber Tln B in the packet-oriented telecommunication network TK1 is likewise intended to be monitored, and therefore the identifier (e.g. SIP-URL) of this subscriber Tln B is flagged as the so-called target identifier (e.g. entered into a special list which is stored on the switching functions S-CSCF1, S-CSCF2, S-CSCF3, P-CSCF1, P-CSCF2, P-CSCF3) so that monitoring ÜW_TlnB can be recognized and initiated by the Serving Call Session Control Function S-CSCF1 in which the subscriber Tln B is usually located.

In addition, call forwarding AW_TlnB is again set up for the identifier of the subscriber Tln B to be monitored in the Serving Call Session Control Function S-CSCF1. This call forwarding AW_TlnB forwards a call for the subscriber Tln B to, by way of example, an access point for a subscriber Tln C whose identifier is not flagged as a target identifier for monitoring.

If—as in a schematic course in FIG. 1—a subscriber Tln A connected to the packet-oriented telecommunication network TK2 sets up a call to the subscriber Tin B to be monitored in the packet-oriented telecommunication network TK1, in a first step 21 the call setup is signaled from the access network ANW2 via the media gateway MGW2 to the Proxy Call Session Control Function P-CSCF2 of the IP Multimedia Subsystem IMS2. This signaling is then forwarded to the serving call session control function S-CSCF2 of the IP multimedia subsystem IMS2. In a second step 22, the Serving Call Session Control Function S-CSCF2 of the IP Multimedia Subsystem IMS2 contacts the Serving Call Session Control Function S-CSCF1 of the IP Multimedia Subsystem IMS2. In this case, a request for connection setup with the subscriber Tln B is transmitted, e.g. in the form of an SIP message, to the Serving Call Session Control Function S-CSCF1.

In a third step 23, the Serving Call Session Control Function S-CSCF1 recognizes firstly the call forwarding AW_TlnB for the subscriber Tln B to be monitored. Secondly, it is also established that the identifier of the subscriber Tln B is flagged for monitoring ÜW_TlnB, and therefore a parameter (e.g. the identifier of the subscriber Tln B to be monitored) is entered into a signaling message (e.g. SIP message) which is used to signal the call forwarding. To enter the parameter (e.g. the identifier), the "SIP History Info header" or the "SIP Diversion header" (from IETF draft-levy-SIP-diversion-08) can be used.

Only after the identifier of the subscriber Tln B to be monitored has been entered into the signaling message (e.g. SIP message) is the call forwarding acknowledged in a fourth step 24, e.g. by means of the SIP message, to the Serving Call Session Control Function S-CSCF2 of the IP Multimedia Subsystem IMS2 in the packet-oriented telecommunication network TK2 of the calling subscriber Tln A. In parallel with this, the signaling—e.g. a copy of the SIP message—of the call forwarding is forwarded in a fifth step 25 to the monitoring device LEA of the office or authority authorized for monitoring via the lawful interception interface LI1 on the basis of the monitoring ÜW_TlnB of the subscriber Tln B.

In a sixth step 26, a request for call setup with the access point of the subscriber Tln C, e.g. in the form of an SIP message, is then sent to the Serving Call Session Control Function S-CSCF3 of the IP Multimedia Subsystem IMS3 in the packet-oriented telecommunication network TK3 on the basis of the call forwarding AW_TlnB. In a seventh step 27, the signaling message (e.g. SIP message) is checked by the Serving Call Session Control Function S-CSCF3. By way of example, parameters entered into the "SIP History Info header" or into the "SIP Diversion header" (e.g. identifier of a subscriber Tln B to be monitored) are checked to determine whether they are flagged as a target identifier for monitoring—e.g. whether the identifier of the subscriber Tln B, which is entered in the SIP History Info header or in the SIP Diversion header, is in the special list containing the identifiers to be monitored.

If this check establishes that, by way of example, the identifier of the forwarded subscriber Tln B is an identifier which is to be monitored then although firstly, in an eighth step 28, the signaling is transmitted from the IP multimedia subsystem IMS3, for example via a media gateway MGW3, to the access network ANW3—and hence to the access point of the subscriber Tln C, in a ninth step 29 the monitoring of the forwarded subscriber Tln B is initiated by the Serving Call Session Control Function S-CSCF3 on the basis of the monitoring ÜÜW_TlnB which has been established. This means that, by way of example, the signaling information (e.g. a copy of the SIP messages) is sent from the Serving Call Session Control Function S-CSCF3 via the lawful interception interface LI3 of the packet-oriented telecommunication network TK3 to the monitoring device LEA of the office or authority authorized for monitoring.

In a tenth step 30, the call is then set up directly between the calling subscriber Tln A (or his access point) and the access point of the subscriber Tln C for data transmission (e.g. IP telephony, e-mail, etc.) via the respective media gateways MGW2, MGW3 of the respective packet-oriented telecommunication networks TK2, TK3. In this case, however, in an eleventh step 31 a call is also set up for data transmission from the media gateway MGW3 of the packet-oriented telecommunication network TK3 via the lawful interception interface LI3 of the packet-oriented telecommunication network TK3 to the monitoring device LEA of the office or authority authorized for monitoring so that the transmitted contents can be recorded, eavesdropped upon, etc., for example, by the monitoring device LEA.

The check or test for the monitoring ÜW_TlnB for the signaling contents (for the "interception related information" (IRI)) can be initiated and performed as an extension to what has been described previously in all involved switching functions S-CSCF1, S-CSCF2, S-CSCF3, P-CSCF1, P-CSCF2, P-CSCF3 in which a subscriber can be identified as the subscriber Tln B to be monitored (e.g. using a special list of identifiers to be monitored which is stored therein). It is thus also possible to meet requirements for the monitoring ÜW_TlnB which involve parts of the communication in a call associated with a subscriber Tln B to be monitored taking place outside the area of influence of the office or authority authorized for monitoring (e.g. in another country etc.).

In addition, the monitoring ÜW_TlnB of the content of a call during call forwarding AW_TlnB—of what is known as the content of communication (CC)—can be initiated and performed in all "transit"
network elements in which a subscriber can be identified as the subscriber Tln B to be monitored (e.g. using a special list of identifiers to be monitored which is stored therein). Examples of such "transit" network elements are media gateways MGW3, serving GPRS support nodes (SGSN), which are used in a general packet radio service (GPRS) or in a packet switch domain of the UMTS network for recognizing and performing data transmission from and to the terminal of a subscriber Tln A, Tln B, Tln C, for example, or session border controllers (SBC), which can be used for voice-over IP in the calls for signaling and data transmission between the subscribers Tln A, Tln B, Tln C, for example in order to allow call setup between two terminals which use different protocols (e.g. SIP, H.323, etc.) for voice-over-IP, etc.

The method can be used not only for single call forwarding AW_TlnB—as described in FIG. 2 for the sake of simplicity—but also for several instances of call forwarding AW_TlnB in series. For every instance of call forwarding AW_TlnB, a parameter (e.g. identifier of the subscriber registered in the respective switching function) is entered, and in the case of a terminating switching function S-CSCF3 it is then possible to initiate monitoring ÜW_TlnB after all the parameters entered for the forwarding operations have been checked.

In addition, the method according to the invention can be used not only in combination with an IP Multimedia Subsystem IMS1, IMS2, IMS3 and with SIP but rather can also be used in packet-oriented telecommunication networks in which only SIP (without an IP Multimedia Subsystem IMS1, IMS2, IMS3) or another protocol is used for managing the calls, such as H.323.

The invention claimed is:

1. A method for lawful interception during call forwarding in a packet-oriented telecommunication network in which switching functions are provided by servers and wherein calls associated with a subscriber with call forwarding are intended to be monitored by lawful interception, said method comprising:
   notifying a first switching function, which is responsible for a called subscriber with call forwarding, of monitoring of the calls associated with the subscriber with call forwarding;
   writing, by the first switching function, an identifier of the subscriber with call forwarding into a prescribed parameter of a switching protocol;
   signaling the call forwarding to a second switching function, which is responsible for a calling subscriber;
   identifying, and initiating, by a third switching function to which the call has been forwarded, the monitoring of the subscriber with call forwarding using the prescribed parameter of the switching protocol.

2. The method as claimed in claim 1, wherein a plurality of call forwarding operations are performed in series in the packet-oriented communication network for the subscriber to be monitored.

3. The method as claimed in claim 1, wherein the switching protocol used in the packet-oriented telecommunication network comprises Session Initiation Protocol SIP.

4. The method as claimed in claim 3, wherein the identifier of the subscriber with call forwarding to be monitored is entered into the SIP History-Info header based on RFC 4244.

5. The method as claimed in claim 3, wherein the identifier of the subscriber with call forwarding to be monitored is entered into the SIP Diversion header based on IETF draft-levy-sip-diversion-08.

6. The method as claimed in claim 1, wherein the packet-oriented telecommunication network comprises an IP multimedia subsystem which provides the switching function as a function.

7. The method as claimed in claim 1, wherein the switching protocol used in the packet-oriented telecommunication network (is the H.323 protocol.

8. The method as claimed in claim 1, wherein contents of the forwarded call are routed to a monitoring entity via a media gateway or via a gatekeeper or serving GPRS support node or session border controller.

9. The method as claimed in claim 1, wherein the monitoring of the contents of the forwarded call is initiated and performed in the media gateway or serving GPRS support node or session border controller without interaction with the switching function.

10. The method as claimed in claim 1, wherein lawful interception is activated only for particular switching functions provided by servers in the packet-oriented telecommunication network, or in network elements such as the media gateway or serving GPRS support node or session border controller.

11. An apparatus, comprising:
   at least one memory comprising computer instructions; and
   at least one processor,
   wherein the at least one memory and the computer instructions are configured to, with the at least one processor, cause the apparatus at least to
   after receipt of a notification of monitoring of calls associated with a first subscriber and receipt of a request for connection setup of a call with the first subscriber from a calling subscriber, detect that the connection setup is to be forwarded to a second subscriber,
   enter into a signaling message an indication indicating the first subscriber to be monitored,
   transmit the signaling message to a node configured to perform a control function in order for a proxy control function to instruct a media gateway to provide contents of the call from the media gateway to a monitoring entity,
   and transmit the signaling message towards a switching function controlling the second subscriber.

12. An apparatus of claim 11, wherein the at least one memory and the computer instructions are configured to, with the at least one processor, cause the apparatus at least to transmit the signaling message as a signaling message used to signal a call forwarding.

13. An apparatus of claim 11, wherein the at least one memory and the computer instructions are configured to, with the at least one processor, cause the apparatus at least to enter the indication in history info header or in diversion header of a session initiation protocol message.

14. An apparatus of claim 11, wherein the monitoring comprises lawful interception.

15. An apparatus, comprising:
   at least one memory comprising computer instructions; and
   at least one processor,
   wherein the at least one memory and the computer instructions are configured to, with the at least one processor, cause the apparatus at least to
   after receipt of a notification of monitoring of calls associated with a first subscriber and receipt of a request for connection setup with the first subscriber, detect that the connection setup is to be forwarded to a second subscriber,
   enter into a signaling message an indication indicating the first subscriber to be monitored
   transmit the signaling message to a node configured to perform a control function,
   wherein the at least one memory and the computer instructions are configured to, with the at least one processor, cause the apparatus at least to transmit the signaling message to a switching function from which the request for the connection setup was received.

16. An apparatus of claim 15, wherein the at least one memory and the computer instructions are configured to, with the at least one processor, cause the apparatus at least to transmit a second signaling message comprising the indication indicating that the first subscriber is to be monitored towards a switching function controlling the second subscriber.

17. An apparatus, comprising:
at least one memory comprising computer instructions; and
at least one processor,
wherein the at least one memory and the computer instructions are configured to, with the at least one processor, cause the apparatus at least to
upon receiving a request for a connection setup of a call comprising setting up a forwarded connection forwarded from a forwarded subscriber called by a calling subscriber, check the request for the connection setup to determine if an indication indicating the forwarded subscriber to be monitored is present in the request,
initiate monitoring of the forwarded subscriber if the indication is present in the request, and
provide signaling to a proxy control function to enable the proxy control function to instruct a media gateway to provide contents of the call from the media gateway to a monitoring entity, wherein a signaling message is received at a switching function controlling a third subscriber, the signaling message comprising the indication of the forwarded subscriber to be monitored.

18. An apparatus of claim 17, wherein the request for connection setup comprises a session initiation protocol message.

19. An apparatus of claim 18, wherein the at least one memory and the computer instructions are configured to, with the at least one processor, cause the apparatus at least to check the indication in history info header or in diversion header of the session initiation protocol.

20. An apparatus of claim 17, wherein the monitoring comprises lawful interception.

21. An apparatus, comprising:
a first receiver configured to receive a notification of monitoring of calls associated with a first subscriber;
a second receiver configured to receive a request for connection setup with the first subscriber;
a detector configured to detect that the connection setup is to be forwarded to a second subscriber;
a modifier configured to modify a signaling message to contain an indication indicating the first subscriber to be monitored
a transmitter configured to transmit the signaling message to a node configured to perform a control function,
wherein the transmitter is configured to transmit the signaling message to a switching function from which the request for connection set up was received.

22. An apparatus according to claim 21, wherein the transmitter is configured to transmit another signalling message comprising the indication towards a switching function controlling the second subscriber.

23. A method for lawful interception during call forwarding in a packet-oriented telecommunication network, comprising:
receiving from a first switching function at a second switching function a request for connection setup, the request comprising an identifier of a first called subscriber, wherein a call associated with the first called subscriber is intended to be monitored by means of lawful interception and is to be forwarded to a second called subscriber, and wherein the second called subscriber is registered with the second switching function; and
the second switching function providing signaling to a proxy control function to enable the proxy control function to instruct a media gateway to provide contents of the call from the media gateway to a monitoring entity; and receiving from the first switching function, a signaling message comprising an indication of the forwarded subscriber to be monitored.

24. A network element in a packet-oriented telecommunication network, comprising:
at least one memory comprising computer instructions; and
at least one processor,
wherein the at least one memory and the computer instructions are configured to, with the at least one processor, cause the apparatus at least to:
receive from a first switching function a request for connection setup, the request comprising an identifier of a first called subscriber, wherein a call associated with the first called subscriber is intended to be monitored by means of lawful interception and is to be forwarded to a second called subscriber, and wherein the second called subscriber is registered with the second switching function;
use the identifier of the first called subscriber to instruct a media gateway, via a proxy control function, to provide contents of the call from the media gateway to a monitoring entity; and receive, from the first switching function, a signaling message comprising an indication of the forwarded subscriber to be monitored.

* * * * *